(12) United States Patent
Bergevin

(10) Patent No.: US 6,742,576 B2
(45) Date of Patent: Jun. 1, 2004

(54) HEAT EXCHANGER BARRIER RIBBON WITH POLYMERIC TUBES

(75) Inventor: Kevin Bergevin, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/255,722

(22) Filed: Sep. 26, 2002

(65) Prior Publication Data
US 2003/0094264 A1 May 22, 2003

Related U.S. Application Data
(60) Provisional application No. 60/325,222, filed on Sep. 27, 2001.

(51) Int. Cl.⁷ .............................. F28F 13/18; F28F 1/00; F16L 9/14
(52) U.S. Cl. ................ 165/133; 165/177; 165/171; 165/172; 138/143
(58) Field of Search ................................ 165/133, 177, 165/905, 171, 168, 172; 138/139, 143

(56) References Cited

U.S. PATENT DOCUMENTS

| | | | |
|---|---|---|---|
| 3,349,469 A | * 10/1967 | Muije et al. ............. 228/158 |
| 3,648,768 A | 3/1972 | Scholl | |
| 3,831,664 A | * 8/1974 | Pogson ................. 165/80.5 |
| 4,687,053 A | * 8/1987 | Paulus et al. ............ 165/133 |
| 4,779,573 A | 10/1988 | Chilies | |
| 4,853,297 A | * 8/1989 | Takahashi et al. ........ 138/139 |
| 5,076,329 A | * 12/1991 | Brunnhofer ............. 138/137 |
| 5,097,897 A | * 3/1992 | Watanabe et al. ......... 165/170 |
| 5,167,259 A | * 12/1992 | Brunnhofer ............. 138/137 |
| 5,469,915 A | * 11/1995 | Cesaroni .............. 165/171 |
| 5,513,432 A | * 5/1996 | Sasaki et al. ........... 165/171 |
| 6,589,617 B2 | * 7/2003 | Hsich et al. ............. 428/35.9 |

FOREIGN PATENT DOCUMENTS

| | | |
|---|---|---|
| DE | 28 19 054 | 4/1979 |
| EP | 572187 A2 | 12/1993 |
| EP | 864 823 A2 | 1/1998 |
| GB | 2034021 A | 5/1980 |
| WO | WO 93/10416 | 5/1993 |

OTHER PUBLICATIONS

Patent Abstracts of Japan, JP 11 211384 (Matsushita Electric Ind. Co., Ltd), Aug. 6, 1999.

* cited by examiner

*Primary Examiner*—Henry Bennett
*Assistant Examiner*—Tho V. Duong

(57) ABSTRACT

Heat exchanger structures for conducting fluid are provided in the form of multiple spaced-apart polymeric tubes embedded in foil laminate which includes metal and at least one polymer. Useful polymers are polyolefins, polyesters and polyamides. The metal provides barrier protection making the structure suitable for refrigeration uses as well as providing an extended heat transfer surface between the tubes for when the elements are used for heat transfer, and the polymer on the foil permits it to be sealed closely around the tubes to improve heat transfer. The tubes are of a geometry which provides burst strength, so that the metal can be quite thin.

21 Claims, 3 Drawing Sheets

HEAT EXCHANGER BARRIER RIBBON WITH POLYMERIC TUBES

CROSS REFERENCE TO RELATED APPLICATION

This application claims the benefit of U.S. Provisional Application No. 60/325,222, filed Sep. 27, 2001.

FIELD OF THE INVENTION

The invention relates to plastic tube fluid handling means for use in heat exchangers and more particularly to such means with a metal barrier layer in the form of heat transfer ribbon.

BACKGROUND OF THE INVENTION

Among the challenges in making plastic heat exchangers is the need for improved barrier properties. In some applications, such as air-air heat exchange, such as in a charge air cooler, permeability of the plastic tubes is not a problem. In other applications, permeability must be well managed. Among the highest demands for low permeability are refrigeration applications. There is a need to keep the refrigerant in and both water vapor or moisture and air out. Refrigerants are also under pressure, higher in condensers and lower in evaporators, adding to the need for good permeation control.

It has been recognized that metal layers will provide impermeability to polyamide tubes for use in heat exchangers. However, structures and procedures for obtaining good impermeability for practical use in refrigeration systems from the combination of metal and plastic or polyamide and aluminum are not available. Some have suggested applying metal after assembling a structure, such as by sputtering. However, sputtering, while it may give a complete coating, does not provide the impermeability needed. Also, thicker metal layers would be needed to permit improved heat transfer from a web to the tubes. Much of the art uses fins of aluminum brazed onto aluminum tubes perpendicular to the tubes to improve heat exchange, which is not readily done with plastic tubes.

Others have proposed a web between tubes, but no-one has yet developed an appropriate configuration of tubes and metal to obtain the needed impermeability, along with maximum heat transfer.

U.S. Pat. No. 4,069,811 discloses in FIG. 7 a heat exchanger element with spaced-apart copper or plastic tubes surrounded by and encased in spot-welded sheets of a rigid, preferably black, metal absorber plate. U.S. Pat. No. 5,469,915 shows tubes of plastic or metal encased in and held apart by plastic sheets. European Patent Publication 864,823 A2, discloses tubes for solar heat exchangers made of an elastomer or plastic inner layer, a stiffener layer of thermally conductive metal such as aluminum in the form of a mesh or a helical layer, and optionally an outer layer of the same elastomer or plastic. The inner polymer layer can be 0.1–2.5 mm (0.004–0.1 inches) thick, preferably 0.1–0.3 mm (0.004–0.012 inches), and the stiffener can be 0.1–2 mm (0.004–0.079 inches) thick. However, although the metal stiffener may absorb heat well, it is taught to be used as a mesh or helical layer, so it would not provide any degree of impermeability.

U.S. Pat. No. 3,648,768 shows making a web of plastic with parallel tubes spaced apart in the web. It says nothing about barrier layers or using metal in the webs.

SUMMARY OF THE INVENTION

The invention provides a structure for use in heat exchangers comprising a plurality of polymeric tubes arranged in parallel and placed at least 1½ tube diameters apart measured center-to-center, said tubes being held in place by, surrounded by and sealed to a laminated foil, said foil having two faces, one facing toward the tubes, and the other facing away from the tubes, said foil comprising at least one layer of metal with at least one polymer layer on at least the side facing the tubes, said tubes having an inner diameter in the range of 0.5–10 mm and a wall thickness in the range of 0.05–0.3 mm, said foil having a total thickness in the range of 0.05–0.25 mm and a total metal thickness in the range of 0.002–0.1 mm.

Preferably, from 5 to 20 tubes are used in the structure, and preferably the inside diameter of the tubes is 1 to 3 mm (and most preferably having a wall thickness in the range of 0.1–0.25 mm). Moreover, preferably the total thickness of foil is in the range of 0.07–0.2 mm (most preferably 0.1–0.15 mm) and the total thickness of the metal layer(s) is preferably in the range of 0.005–0.02 mm (most preferably 0.005–0.01 mm).

Such a structure is herein referred to as a barrier ribbon. Reference is made throughout the case to "tubes", "tubing", and the like. It is to be understood that these terms are often used interchangeably, and it will be apparent to the reader that in some cases either term could apply.

Moreover, those having skill in the art to which the invention pertains will recognize that throughout the description the terms "foil", "laminated foil", "film", and the like are intended to convey the same meaning.

DETAILED DESCRIPTION OF THE INVENTION

Typically an evaporator in a refrigeration or air conditioning system consists of a number of finned metal tubes, the tubes having a greater internal diameter than the liquid refrigerant inlet tubes, to allow for expansion and cooling, and having a specified length to allow for complete evaporation to the gaseous phase. Condensers are configured in an analogous manner, but usually must operate at higher pressures to effect conversion of the gaseous refrigerant to a liquid phase. When attempting to design a refrigerant-capable exchanger from polymeric tubing, a number of factors must be considered:

i) The refrigerant must be retained inside the tubing structure for a long time such as for many years, with minimal losses.

ii) Moisture and air must be prevented from permeating into the tubing. Air is non-condensable and would diminish the performance of the heat exchanger. Moisture reacts with refrigerants such as hydrofluorocarbons (HFC's) and hydrochlorofluorocarbons (HCFC's) and the products of this reaction can lead to failure of the system due to corrosion and sludge.

iii) Many refrigerants operate under high pressures (several hundred psig) and the tubing must be capable of withstanding 3–5 times the normal system operating pressures.

Previous work has shown that lengths of co-extruded tubing 3–9 m (10–30 feet) long, formed into coiled structures of closely-spaced tubing, with suitable end connections, can transfer heat between refrigerant and air streams. Unfortunately, the best polymeric barrier materials available may at times be insufficient to keep moisture and air entry below an acceptable level.

In heat exchangers comprised of plastic tubing, typically all of the heat transfer area is primary surface or wetted surface, owing to the low thermal conductivity of plastics. Secondary heat transfer surfaces such as transverse fins are generally of little use and not used.

Figure 1:
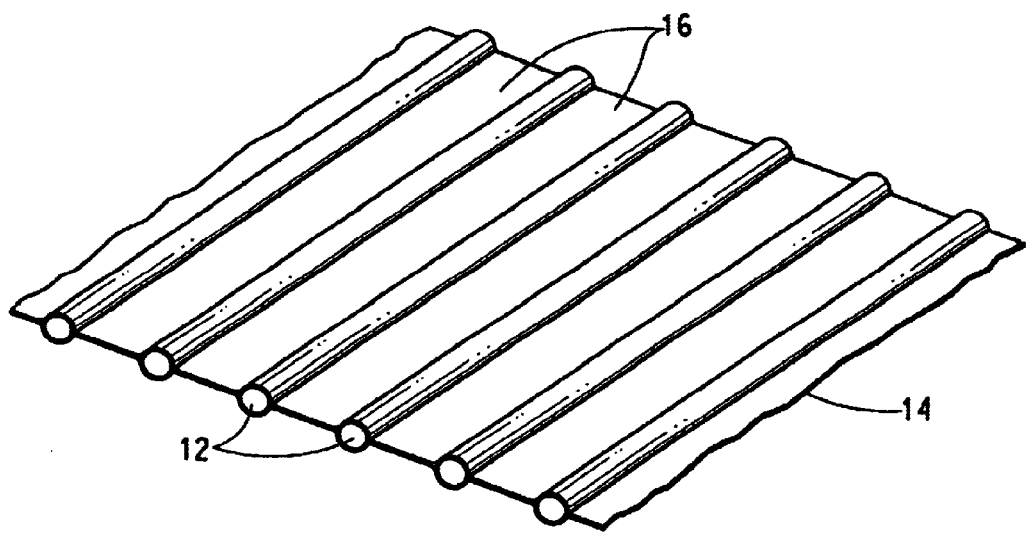
FIG. 1 is an illustration of the structure of the invention in perspective.
Figure 3:
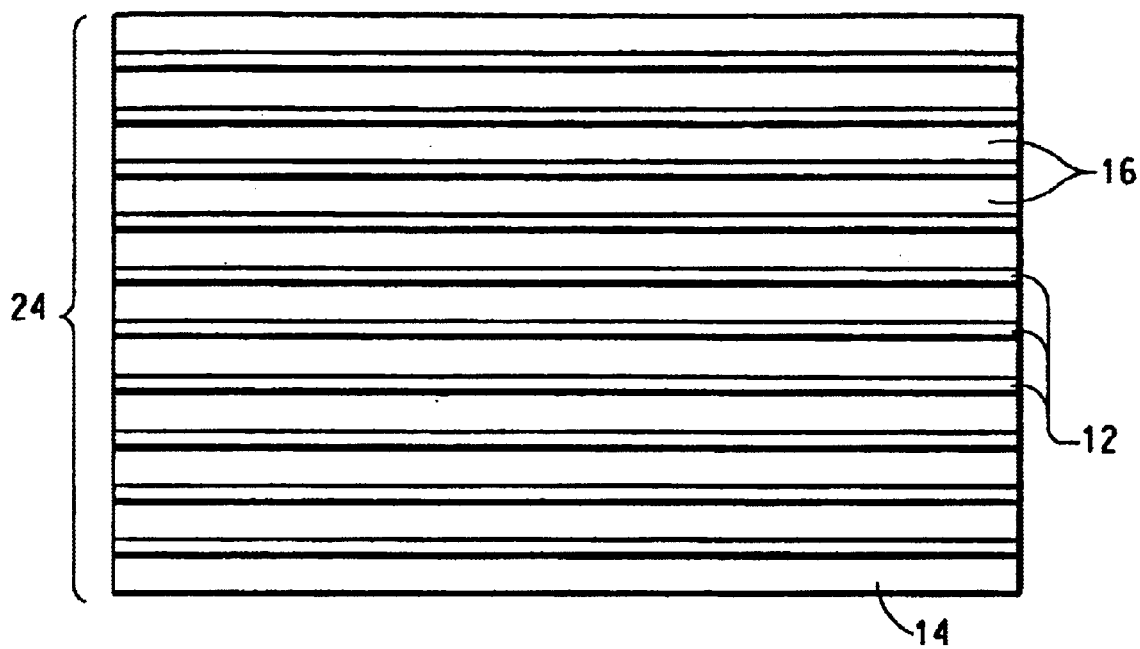
FIG. 3 is a plan view of a structure of the invention.

Having reference to FIGS. 1 and 3, the present invention contemplates a composite structure in which an array of polymeric tubes 12 is completely surrounded by a thermally conductive film 14. Instead of the polymeric tubes 12 being in close proximity, they are spaced farther apart, with generally at least about one and one-half tube diameter spacing (measured from center to center) between each tube 12, and are connected by a webbing 16 of thermally conductive film between each tube 12 or (as shown) outside the tube 12 positioned at the outside end. The thermally conductive webbing 16 serves as a secondary heat transfer surface and reduces the quantity of tubing required in the construction, consistent with other needs, such as the need for low pressure drop.

Figure 2:
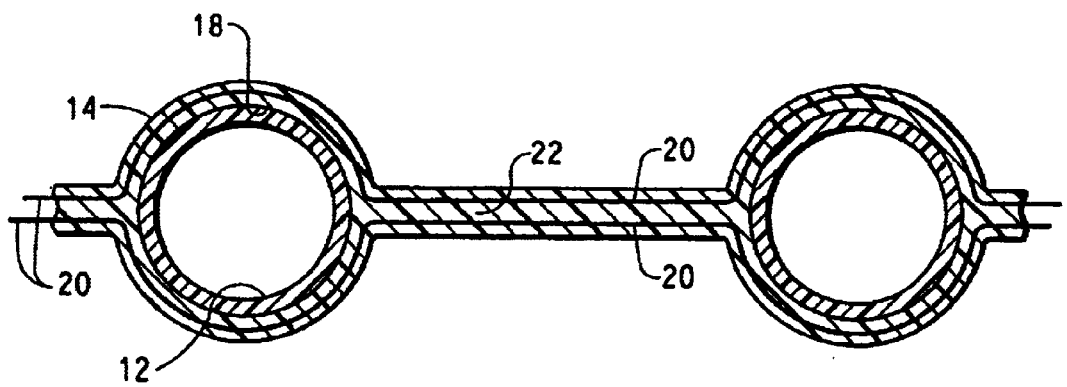
FIG. 2 is a more detailed end view of a cross section of a typical structure of the invention.

As shown in FIG. 2, the thermally conductive film 14 is wrapped in conformal fashion around the tubes 12 in the array and is preferably bonded to the outer surface 18 of the tubes 12 where it contacts the tubes 12 and to itself in the spaces adjacent to the tubes 12. It is desirable to produce a tight wrap around the tubes 12, with no significant free volume between the outside surface 18 of the tubes 12 and the inside surface of the film 14 in order to maximize heat transfer performance. For example, structures may be formed such that there are no significant air gaps or voids between the foil and the tubes.

In particular, when the thermally conductive film consists of a laminate of a metal layer 20 such as aluminum with one or more polymeric layers 22, where polymer layer 22 is on the side of the film 14 facing the tubes 12 and one or more optional polymer layers 22 are on the side of the film 14 facing away from the tubes 12, then the metal layer 20 also provides a suitable barrier, capable of preventing excessive moisture and air entry. Such foil laminates are widely available and are of relatively low cost, compared with other materials of similar barrier properties, such as those containing multiple inorganic layers applied by plasma deposition processes. Tubes 12 may optionally comprise two or more layers of polymer. The polymer of the outermost layer of the tubes 12 is bondable with the polymer layer 22 of the foil 14 facing the tubes 12.

Furthermore, the location of the high barrier layer outside of, and surrounding the tubing, as shown in FIGS. 1, 2 and 3, serves to keep the tubing relatively dry. This is significant when the tubing is a moisture sensitive material such as a polyamide. The burst pressure of dry polyamide tubing is much higher than it is for polyamide exposed to environmental humidity. This feature allows the tubing to be designed with a larger tube diameter, and this further enables a reduction in the number of tubes, thus lowering cost without resulting in excessive tube-side pressure drop. As is known in the art, pressure drops are measured in heat exchangers both on the tube side, meaning inside the tubes, and on the air side, meaning outside the tubes.

The combination of all of these features results in a relatively simple low cost structure of a number of polyamide tubes with outer bonding layer inside a foil laminate with inner bonding layer which could be produced in a low cost process and which would be fully functional as a heat exchanger material for a wide variety of refrigerant-air and other exchangers.

In addition, the relatively large spacing between tubes would allow the barrier ribbon to be slit as needed, possibly at the ends to facilitate joining operations, or elsewhere to facilitate water drainage, etc.

Corrosion of the metallic layer of the foil can be minimized with the inclusion of a polymeric layer outside of the metallic layer, i.e. the metallic layer is sandwiched. Alternatively, for more corrosive applications, a more corrosion resistant metal such as nickel or tin may be used as the metallic layer. Aluminum here means the metal itself or various appropriate alloys based on aluminum. Two or more layers of foil can be used, and they may be made from a single sheet that has been folded, or from multiple sheets, with the plastic layers applied to each layer of metal or to the whole set of foil. Also, when a first layer of foil is applied to one side of a tube or set of tubes, and then a second layer is applied to the other side, the same piece of foil can be folded and used on both sides.

For some applications, it may be desirable for the thermally conductive film to be quite flexible, so that the entire bonded structure may be formed into a coil shape. Also, the barrier ribbon could be rolled up transversely and placed inside a larger pipe to form a "coaxial" heat exchanger, with the tubes running substantially parallel to the outer pipe. Heat exchangers made from barrier ribbon are lighter in weight than existing all-metal exchangers.

Barrier ribbon material as depicted in FIG. 3 at 24 could be produced in large sections and cut into strips of desired width and length for making coils. Potentially less labor intensive processes may be used for the manufacture of heat exchangers, compared with the processes for making traditional all-metal exchangers.

Traditional metal fins are easily bent and damaged, affecting air flow. Elastic limits of aluminum fins are easily exceeded and they suffer plastic deformation, staying out of shape once they are bent. This also makes cleaning difficult. Barrier ribbons of the invention are primarily polymeric and flexible and behave with much greater elasticity or spring back and are reinforced by the tubing embedded within the ribbon.

Coils made by winding lengths of ribbon around a central core can be circular in shape, or they can be in other shapes such as oval, etc., and the width of the ribbon can be varied, in order to optimize heat transfer and air side pressure drop.

Figure 4:
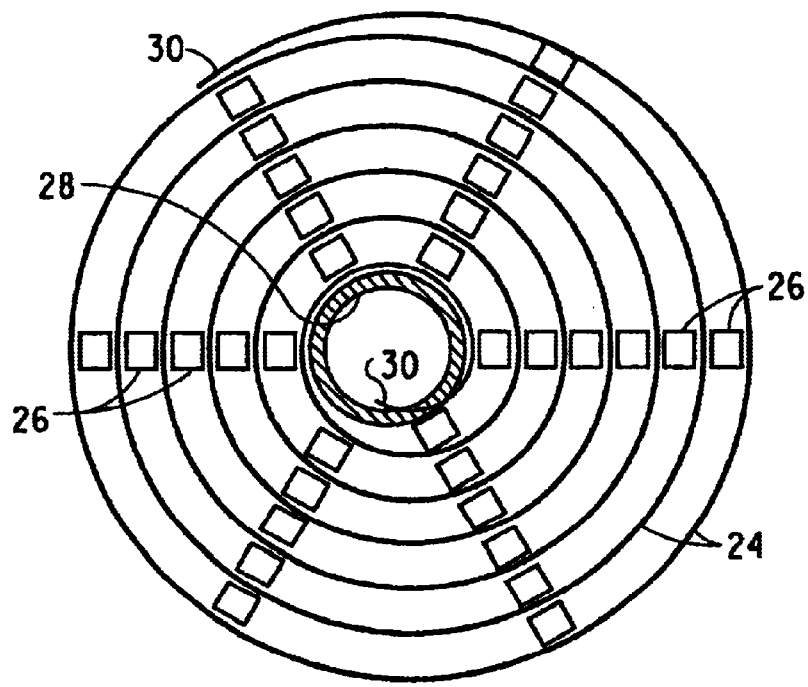
FIG. 4 is a schematic view of a heat exchanger using a structure of the invention.

Simple spacer elements 26 can be designed to separate layers of the ribbon 24 within the coil, in order to maintain the desired spacing between the layers, as illustrated in FIG. 4. In this FIGURE, air flows into the face of the coil, formed by ribbon layers 24 wound around a central core 28. The ends 30 of the ribbon 24 are suitably connected to form an integral structure.

Figure 5:
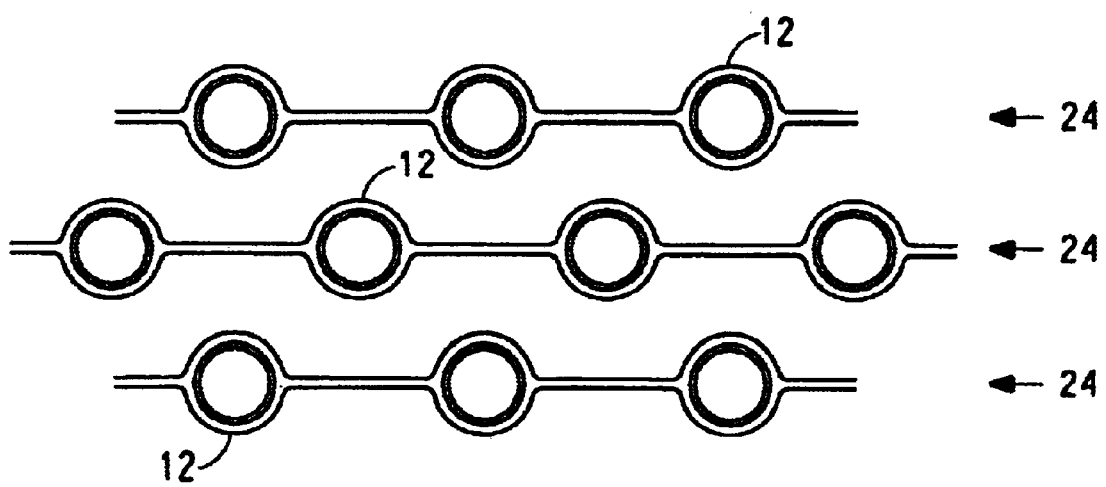
FIG. 5 is an end view of a group of multiple ribbons of the invention configured as they would be used in a heat exchanger.

Heat exchangers may also be constructed in other shapes, i.e. ribbons may be straight rather than coiled or wound. By staggering or offsetting successive layers of ribbon 24, as in FIG. 5, a pathway for the air (as indicated by arrows) is created as it flows through the ribbon coil between the layers of ribbon 24. In this case, the tubes 12 embedded in the ribbon 24 serve to increase the turbulence of the air flow across the ribbon 24.

One disadvantage of current metal heat exchangers is the relatively large tubes which block air flow. In the present case the structure comprises a multiplicity of much smaller tubes which are embedded in the fins. The spacing between successive layers of the ribbon can be varied, in order to optimize heat transfer and air side pressure drop.

The tube spacing within the ribbon can be varied, and can either be uniform or can vary across the ribbon. Tubes can be circular in cross-section or can be elliptical or of other non-circular shape. The tubing may be extruded as elliptical in shape or may be extruded as circular in shape and then made elliptical in the process of making the ribbon.

It is to be understood that the basic ribbon design may be modified by punching holes or slits or forming louvers in the film layers, as long as the integrity of the tubing is not compromised, in order to increase air turbulence or to facilitate water or condensate drainage.

A number of different polymers could be chosen for the tubing material, but selection depends on the needs for specific applications and should be based on: service temperature, chemical resistance and pressure. Moreover, multiple layers of polymer may be used in the tubing or in the foil.

Tube diameter and wall thickness are sized to handle the pressure of desired refrigerants. For example dry nylon 66 tubing, of 2 mm (0.079 inches) OD and 0.18 mm (0.007 inches) wall thickness will burst at pressures >140 bar (>2000 psi) and is desirable for high pressure applications, and the nylon can be kept dry by the barrier layer.

One may optionally co-extrude layers on the exterior of tubing, or add layers on one side of the film material to enhance bonding. It is important in some cases to bond the film layer to the tubing and to the opposing film layer in order to minimize resistance to heat transfer and to prevent pocketing of refrigerant between the tubing and the foil laminate.

Metal surrounds the tubing except in small areas at nodes and edges and this provides a significant improvement in barrier to permeation of refrigerant, moisture and air. The thermal conductivity of aluminum is high and tube-to-tube distances are typically small, so only a thin layer is required, in order for it to function as an extended heat transfer surface. Within the foil laminate, more than one layer of metal could be used or the metal layer thickness could be varied to achieve desired levels of barrier or heat transfer.

The number of parallel tubing circuits can be varied to bring tube-side pressure drop within the desired range. The tube ends of the barrier ribbons can be joined into larger plastic or metal pipes, such as by encapsulating them with a thermoset or thermoplastic or by melt bonding the tube ends into a small plastic tube sheet.

It is readily appreciated that any number of adaptations of the concepts disclosed herein may be made. For example, structures may be formed wherein the foil has a layer of polyolefin on the side facing the tubes and a layer of polyamide on the side of the foil facing away from the tubes. Or, structures can be formed wherein the foil has no layer of polymer on the side facing away from the tubes. Other structures contain at least one layer of polymer in the foil which is a thermoset adhesive.

Further structures include those in which the polymer of at least the layer facing away from the tubes in the foil is polyamide; structures wherein the polymer of the outer layer of the tubes is bondable with the polymer layer of the foil facing the tubes; and structures wherein polymer of at least one layer of the tubes and at least one layer of the polymer on the foil are both polyamide. Polyesters are also contemplated as a suitable layer material.

The approach used in Example 1 began when it was realized that the tubes could be tacked onto one of the film layers by applying heat and pressure. Though the tubes were only bonded to the film over a very narrow area, the bond was sufficient to hold the tubes in place long enough to allow the process to be completed. It was necessary to have some means to line up the tubing and this was accomplished by pulling the tubing through a block of polytetrafluoroethylene (PTFE) which had slots in it. The slots expose part of the tube surface to the outside. By pulling the film and the aligned tubes, in contact, over a heat source, the tacking of the tubes to the film was achieved. The process was completed by sealing the edges of a second film to the first film and then evacuating all of the air which was between the tubes and the film, using a vacuum sealer. When the structure was then placed in an oven of suitable temperature, the final bonding together of all layers was completed using atmospheric pressure as the source of pressure.

The vacuum step may impose a limitation on the productivity of the process because it requires that discrete lengths be cut and placed in a vacuum chamber. A continuous, in-line process is sometimes preferred. This may be achieved by using externally applied pressure instead of internally applied vacuum to squeeze out all of the air. This could be achieved by passing the tubing and film through a set of grooved nipping rolls, with rubberized exteriors, or it might be achieved by directing pressurized air or water jets on the structure as it passes through the process. Alternatively, the ribbon could be made by pulling the tubing and laminated foils between heated, grooved plates, as in Example 3. The productivity may be improved by increasing the width of the laminated structure and then slitting the structure to the desired widths needed for the particular applications.

EXAMPLES

Example 1

Tubing with an inside diameter of 1.64 mm (0.065 inches) and a wall thickness of 0.18 mm (0.007 inches) and made from polyamide, particularly nylon 66 resin, was used to make a ribbon structure by bonding the tubing to two film layers. The tubing also contained a heat stabilizer additive, consisting of 0.6 percent of a 7-1-1 (by weight) blend of potassium iodide, cuprous iodide, and aluminum stearate. A set of 10 tubes was unwound from spools, passed through a tube guide and then through a PTFE jig. The PTFE jig had 10 slots in it, which were parallel, coplanar, and uniformly spaced 7.0 mm (0.274 inch) apart (center to center). The nylon tubing was pulled through the jig, and at the same time, was in contact with a film which was heated from below by a hot plate. The hot plate was a "Dataplate Digital Hot Plate" made by Cole-Parmer and its surface was maintained at a uniform temperature of about 125° C. The film was Marvelseal 360 from Ludlow Company and was 127 mm (5 inches) wide and 0.132 mm (0.0052 inches) thick, consisting (in order) of about 0.076 mm (0.003 inches) of low density polyethylene (LDPE), 0.0076 mm (0.0003 inches) of aluminum, 0.033 mm (0.0013 inches) of LDPE and 0.152 mm (0.006 inches) of nylon 6. The nylon 6 layer of the film was in contact with the hot plate and the 0.076 mm (0.003 inches) LDPE layer was facing (and in contact with) the tubes. The heat from the hot plate partially melted the LDPE layer and bonded the tubes to the film at their tangent points. The film and tubes were pulled at a uniform speed of 152 cm (5 feet) per minute with a Killion model 4-24 belt puller and cut into 610 cm (20 feet) lengths.

The film (with the attached parallel tubes) was then placed facing a second layer of film (with the LDPE sides facing) and the parallel edges of the two films were heat sealed together using a DOBOY "Hospital Sealer" (a continuous/rotary heat sealer). Lengths of this sleeve were produced which were approximately 610 cm (20 feet) long and 127 mm (5 inches) wide. Short lengths of tubing were peeled back and cut off at each end, so that the film extended past the tubing at each end, in order to allow the next step to proceed.

The sleeves thus formed were then coiled up and placed, one at a time, in an AUDIONVAC AE401 vacuum sealer such that both film ends were laid across the heat seal bar. The chamber was evacuated for one minute and then the ends were heat sealed. This resulted in a sleeve in which the film conformed to the shape of the tubes, since substantially all of the air had been removed from inside the sleeve.

The vacuum-sealed sleeves were then placed, one at a time in a Blue M oven (model OV-490A-3) and heated at 120° C. for 10 minutes. The heat melted the LDPE and bonded the structure together. After the ribbons cooled, the excess edges were slit off, to within about 3 mm (⅛ inch) of the edge of the first tube on each side. The ends were also cut and slit between the tubes to facilitate the end-joining.

Four pieces of ribbon were wound on a circular plastic core (approx. 86 mm (3⅜ inches) OD) with their ends passing through slots in the core, as in FIG. 4. They were inter-wound to make a circular coil with a final diameter of 254 mm (10 inches). The total amount of ribbon wound on the core was approximately 15 m (50 feet), with some additional length for end connections. Each alternating layer of ribbon was staggered or offset from the previous layer in such a way as to create a pathway for air to pass through the coil between the ribbon layers, as in FIG. 5. The ribbons were held by means of plastic spacers (made from glass reinforced polyamide 66 resin) which were threaded onto 12 metal guideposts projecting from the plastic core. The spacers had grooves machined in them which held the ribbons in place. The spacing between layers in the coil was 2.9 mm (0.115 inches) (centerline to centerline distance).

End connections were made by trimming excess film from the ends of the ribbon and then melt-bonding the tube ends into holes in a small, circular nylon 66 tubesheet using hot pins, as taught in U.S. Pat. No. 6,001,291, granted Dec. 14, 1999. This tubesheet was then held in a larger assembly which served to connect it to a metal joint, with the seal being provided by an O-ring. The coil thus made was installed in a Whirlpool window air conditioner as the evaporator, in place of the original metal unit supplied with the air conditioner. The circulating chlorodifluoromethane (R22) refrigerant was passed through an external mass flow meter, which was in line with the standard components (compressor, condenser, expansion device) of the air conditioner, as well as the new evaporator. When this unit was operated, the refrigerant flow rate was measured to be 0.73 kg/min (1.6 lb/min), the refrigerant liquid stream (prior to entering the expansion device) was at 48.9° C. (120° F.) and the refrigerant exiting the evaporator was 2.2° C. (36° F.) and was entirely vapor.

During operation, air was blowing through the evaporator coil, being driven by the standard fan incorporated in the air conditioner. The heat duty (amount of heat transferred from the air to the refrigerant stream, per unit of time) was 1747 Watts (99.4 Btu/min).

The air temperatures were 35.8° C. (96.4° F.) entering the evaporator and 13.1° C. (55.6° F.) exiting the evaporator, with an air flow rate of 1.83 kg/min (4.04 lb/min). The amount of moisture condensed from the air stream was not measured.

While the heat duty was less than the nameplate capacity, it should also be considered that the experimental coil only occupied a fraction of the available area. The rate of heat transfer, on a per unit of volume basis, or on a per unit of facial area basis, was actually slightly higher for the experimental coil, than it was for the original evaporator.

Example 2

Tubing with an inside diameter of 1.60 mm (0.063 inches) and a wall thickness of 0.20 mm (0.008 inches) was used to make a ribbon structure by bonding the tubing to two film layers. The tubing was a coextruded structure in which the inner layer consisted of nylon 66 at 0.165 mm (0.0065 inch) thick and the outer layer consisted of an anhydride-modified low density polyethylene 0.038 mm (0.0015 inch) thick, available from E. I. DuPont de Nemours & Co. as Bynel® 4206. The melting point of the polymer in the outer layer was approximately 102° C., its melt index was 2.5 and its density was 0.92 g/cc. The purpose of the outer layer was to improve the bond between the tubing and the film in the finished ribbon structure. The nylon 66 inner layer contained a heat stabilizer additive, consisting of 0.6 percent of a 7-1-1 (by weight) blend of potassium iodide, cuprous iodide, and aluminum stearate.

A ribbon structure was prepared as in Example 1. The heat from the oven melted the outer layer of the tubing and the inner layer of the film and bonded the structure together. After the ribbons cooled, the excess edges were slit off, to within about 3 mm (⅛ inch), of the edge of the first tube on each side. The ends were also cut and slit between the tubes to facilitate the end-joining.

Six pieces of ribbon were wound on an elliptical core of approximately 102 mm (4 inches) by 229 mm (9 inches) with their ends passing through slots in the core. They were inter-wound to make an elliptical coil of 381 mm (15 inches) by 254 mm (10 inches). The total amount of ribbon wound on the core was approximately 19 m (63 feet), with some additional length for end connections. Each alternating layer of ribbon was staggered or offset from the previous layer in such a way as to create a pathway for air to pass through the coil between the ribbon layers. The ribbons were held by means of plastic spacers, made from glass fiber reinforced polyamide 66 resin, which were threaded onto 12 metal guideposts projecting from the plastic core. The spacers had grooves machined in them which held the ribbons in place. The spacing between layers in the coil was 2.9 mm (0.115 inches), measured as the centerline to centerline distance.

End connections were made by trimming excess film from the ends of the ribbon and then melt-bonding the tube ends into holes in a small, circular polyamide 66 tubesheet using hot pins, as taught in U.S. Pat. No. 6,001,291, granted Dec. 14, 1999. This tubesheet was then held in a larger assembly which served to connect it to a metal header joint, with the seal being provided by an O-ring.

Example 3

Tubing with an inside diameter of 1.55 mm (0.061 inches) and a wall thickness of 0.23 mm (0.009 inches) was used to make a ribbon structure by bonding the tubing to two film layers. The tubing was a co-extruded structure in which the inner layer consisted of nylon 66 at 0.19 mm (0.0075 inches) thick and the outer layer consisted of an anhydride-modified low density polyethylene 0.04 mm (0.0015 inches) thick, available from E. I. DuPont de Nemours & Co. as Bynel® 4206. The melting point of the polymer in the outer layer was approximately 102° C., its melt index was 2.5 and its density was 0.92 g/cc. The purpose of the outer layer was to improve the bond between the tubing and the film in the finished ribbon structure. Ten tubes of the above composition were simultaneously bonded to two layers of BFW-48 film from Ludlow Corporation. The BFW-48 film consists of (in order) approximately 0.038 mm (0.0015 inches) of LLDPE (linear low density polyethylene), 0.022 mm (0.00085 inches) of LDPE (low density polyethylene), 0.007 mm (0.00029 inches) of aluminum foil, 0.022 mm (0.00085 inches) of LDPE and 0.012 mm (0.00048 inches) of PET (polyethylene terephthalate), for a total thickness of approximately 0.10 mm (0.004 inches).

The 10 tubes and 2 films were pulled between a pair of grooved aluminum plates, approximately 178 mm (7 inches) long. Each plate had 10 semicircular grooves running along its length, the width of each groove was 2.3 mm (0.090 inches). The plates faced each other and the order of material position was: bottom plate, bottom film, tubes, top film, top plate. The grooves in the plates were not parallel but they were straight. At the inlet end of the plates the grooves had a (center to center) spacing of 6.52 mm (0.2567 inches) and at the outlet end of the plates the center to center spacing was 5.94 mm (0.2338 inches). The plates were heated and maintained at a temperature of 145° C. A weight of 5 kg (11 pounds) was on top of the top plate, in order to provide pressure. The heat melted the polyethylene layers on the tubing and the film, causing them to bond together.

The films and tubes then passed through a matching set of grooved plates, similar to the above, except that the grooves were parallel and were 5.94 mm (0.2338 inches) apart (center to center) along their entire length. The cooling plates were in contact with hollow metal plates through which cooling water (of inlet temperature 12° C.) was circulated at 2 litres per minute. A small weight of 3.5 kg (7.7 pounds) was located on the uppermost plate in order to press on the materials passing through the plates. All 4 of the grooved plates were covered with PTFE (approximately 0.003 inches thick) in order to minimize friction. The film and tubes were pulled at a uniform speed of 21 cm (0.7 feet) per minute with a Killion model 4-24 belt puller and the edges were trimmed. The resulting structure was a ribbon which had fewer wrinkles than the samples made by Examples 1 and 2, and which could be made in very long lengths, limited only by the size of the film supply rolls and tubing supply spools.

What is claimed is:

1. A structure for use in heat exchanger comprising a plurality of polymeric tubes arranged in parallel and placed at least 1½ tube diameters apart measured center-to-center, said tubes being held in place by, surrounded by and sealed to a laminated foil, said foil having two faces, one facing toward the tubes, and the other facing away from the tubes, said foil comprising at least one layer of metal with at least one polymer layer on at least the side facing the tubes, said tubes having an inner diameter in the range of 0.5–10 mm and a wall thickness in the range of 0.05–0.3 mm, said foil having a total thickness in the range of 0.05–0.25 mm and a total metal thickness in the range of 0.002–0.1 mm.

2. The structure of claim 1 wherein the multiple polymeric tubes number from 5 to 20.

3. The structure of claim 1 wherein the inside diameter of the tubes is from 1 to 3 mm.

4. The structure of claim 1 wherein said tubes further comprise a plurality of layers of polymer including an outer layer of polymer.

5. The structure of claim 4 wherein said foil further comprises at least one polymer layer on the side facing away from the tubes.

6. The structure of claim 4 wherein the polymer of the outer layer of the tubes is bondable with the polymer layer of the foil facing the tubes.

7. The structure of claim 5 wherein the polymer of at least one layer of the tubes and at least one layer of the polymer of the foil are both polyamide.

8. The structure of claim 1 wherein the total thickness of foil is in the range of 0.07–0.2 mm and the total thickness of the metal layer(s) is in the range of 0.005–0.02 mm.

9. The structure of claim 8 where in the total thickness of the foil is in the range of 0.1–0.15 mm and the total thickness of the metal layer(s) is in the range of 0.005–0.01 mm.

10. The structure of claim 1 wherein the inner diameter of the tubes is in the range of 1–3 mm and the wall thickness of the tubes is in the range of 0.1–0.25 mm.

11. The structure of claim 1 wherein the metal is aluminum.

12. The structure of claim 5 wherein the foil has a layer of polyolefin on the side facing the tubes and a layer of polyamide on the side facing away from the tubes.

13. The structure of claim 1 wherein the foil has no layer of polymer on the side facing away from the tubes.

14. The structure of claim 1 wherein at least one layer of polymer in the foil is a thermoset adhesive.

15. The structure of claim 1 wherein there are multiple layers of polymer in the foil.

16. The structure of claim 1 wherein there are multiple layers of metal in the foil.

17. The structure of claim 1 wherein there are both multiple layers of polymer and multiple layers of metal in the foil.

18. The structure of claim 1 wherein there are no significant air gaps or voids between the foil and the tubes.

19. The structure of claim 5 wherein any of said at least one polymer layers is polyester.

20. A heat exchanger comprising the structure of claim 1.

21. A heat exchanger comprising the structure of any of claims 2–20.

* * * * *